Nov. 20, 1956 E. M. CREAMER, JR 2,771,508

COLOR SAMPLER SYNCHRONIZING SYSTEM

Filed April 27, 1951

INVENTOR.
EDGAR M. CREAMER, JR.
BY Allen V. Hazeltine
ATTORNEY

United States Patent Office 2,771,508
Patented Nov. 20, 1956

2,771,508

COLOR SAMPLER SYNCHRONIZING SYSTEM

Edgar M. Creamer, Jr., Philadelphia, Pa., assignor to Philco Corporation, Philadelphia, Pa., a corporation of Pennsylvania Application April 27, 1951, Serial No. 223,245

4 Claims. (Cl. 178—69.5)

Figure 1:
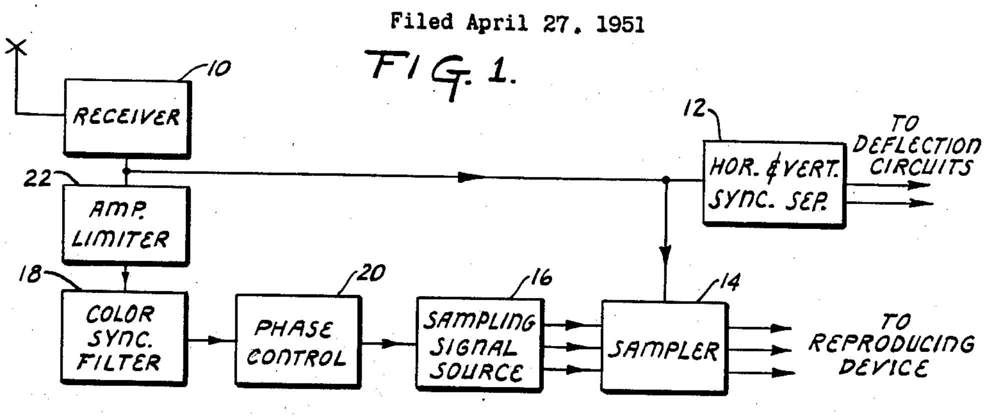

The present invention relates to electrical systems and more particularly to color television systems in which the phase position of the color image component signals is indicated by an appropriate marker signal impressed on the video color wave.

The invention is particularly applicable to and will be described in connection with a color television system in which the video color wave for producing a color image at a receiving position is constituted by sequentially recurring color signal components and in which the marker signal for indicating the phase position of the color signal components consists of a signal having the frequency of recurrence of the color signal components.

To produce a video color wave of the foregoing type the image to be transmitted may be analyzed dot-by-dot by means of a sampling technique producing a series of pulses of video signal energy with the amplitude of each pulse being determined by the ordinate of the video signal at the precise instant at which the pulse is developed. For example, three component color signals may be respectively developed by three separate camera tubes and the continuous signal produced by each of the camera tubes may then be sampled in some preferred manner so as to yield a component color pulse train. By means of multiplexing, the three component pulse trains are interleaved into a composite color pulse train. While this composite color pulse train is amplitude modulated, neverless the amplitudes of adjacent pulses are independent, inasmuch as they represent separate chromatic aspects of the optical image.

In practice, and due to limitations of the available bandwidth at the transmitter, the composite video wave is effectively converted into a sine wave superimposed on a reference level component. This sine wave has a frequency equal to the frequency at which the color signals are sampled, and the level and the amplitude and phase position thereof are determined by the magnitudes of the component color pulses whereby the wave has, at discrete recurrent intervals, an amplitude value proportional to the intensity of each of the color components of the consecutive elements constituting the image.

At the receiver position, the incoming video signal is supplied to a suitable sampling system by means of which there are derived therefrom the individual three color components each bearing the desired color information. Since, in the transmitted video signal, the portions carrying the color information are in effect arranged in multiplex formation, proper color reproduction at the receiver makes it necessary to sample the incoming signal in synchronism with the original sampling exactly at the time when the signal is representative of the color to be reproduced. Alternately, the incoming video signal may be applied directly to an image reproducer, for example to the beam intensity control electrode of a cathode-ray tube the beam intercepting screen of which comprises vertically arranged groups of stripes of different phosphor material producing light of the desired primary colors. In such an arrangement it is necessary to establish the position of the beam in synchronism with the time position of the color samples so that the beam impinges on a phosphor stripe of given primary color at the instant that the corresponding color signal appears on the control electrode of the cathode-ray tube.

To accomplish such synchronous control, it has been proposed to provide the transmitted video signal with a marker signal in the form of a "burst" of a carrier wave having a frequency equal to the frequency at which the sampling at the transmitter is effected. Such a color carrier burst may be impressed on the video signal for a relatively short time on the so-called "back-porch" of the horizontal synchronizing pulses, whereby for each line scan of the image there will be a color carrier burst serving as a color sampling synchronizing signal during the corresponding line scan interval. The color carrier burst so produced may be used to actuate a suitable sampling signal generator, for example of the type disclosed in the copending application of J. C. Tellier, Serial No. 197,551, filed November 25, 1950.

Since the color carrier burst occurs only during the relatively brief period above indicated and the color carrier wave is "off" during the remainder of the line scan period, the frequency spectrum produced by the color carrier burst corresponds to that of a carrier wave which is 100% modulated and has a short duty cycle of the order of 5% or less.

I have found that under these conditions the sideband frequencies of the color carrier wave assume significant amplitude values relative to the amplitude of the carrier itself. Since the color carrier wave has a relatively high frequency, for example of the order of 3.58 mc./sec., and the sidebands are spaced from the carrier wave at frequencies which are multiples of the repetition rate, i. e. multiples of the line scanning frequency of 15,750 cycles/sec. under the present transmission standards, it is apparent that the sidebands are relatively closely spaced to the carrier wave. Under these conditions the color signal sampling generator at the receiver may experience difficulty in recognizing the exact time or phase reference intended by the color carrier burst and, instead of operating at the frequency of the carrier wave, may operate at the frequency of one of the sidebands. Such operation of the color sampling signal generator at the frequency of one of the sidebands of the color carrier burst signal will destroy the synchronism which is required between the transmitter and the receiver and bring about improper color reproduction at the receiver.

It has been proposed to construct the sampling signal generator with such fixed constants that it operates only at a frequency within a limited range centered about the carrier burst frequency. For example, it has been proposed to make the sampling signal generator a piezoelectric crystal controlled oscillator operating at the sampling rate of the transmitter. However, the use of a piezoelectric crystal controlled sampling signal generator has not proved satisfactory due to the small but nevertheless significant variations of the sampling rates at different transmitters. Where it is attempted to produce a sampling signal generator operating at any of a number of frequencies restricted to a range within the small tolerances permissible at the transmitter, it is found that, due to aging and temperature changes of the components at the receiver, etc., the long time stability of the generator is not sufficient to maintain the initial acceptance passband of the generator and erratic operation at frequencies other than the desired carrier frequency occurs.

It is an object of the invention to provide a system ensuring absolute synchronism of the sampling of the color components constituting a color television signal at a transmitter and the display thereof at a receiving position.

A further object of the invention is to provide a system in which color sampling at a receiving position is actuated by a color burst signal applied to the incoming video wave and in which the color sampling signal generator is prevented from operating at sideband frequencies of the color burst signal.

Another object of the invention is to provide a simple and low cost system for synchronizing a color sampling signal generator at the carrier frequency of a transmitted color synchronizing wave, whereby color information contained in the video wave is recognized in exact time or phase reference at the receiver.

A specific object of the invention is to provide a system for ensuring absolute synchronism of a signal generator at a receiver for producing proper sampling of a color television signal having consecutively arranged recurring color signal components.

These and further objects of the invention will appear as the specification progresses.

In accordance with the invention, the foregoing objects are achieved in a color television system utilizing a marker signal wave as an indicator of the time or phase reference of color component signals by utilizing a color signal sequence determining element having a relatively wide frequency range of operation and by so restricting the wave applied to the color sequence determining element of the receiver that the said determining element is actuated only by the desired component of the marker signal. More particularly, and in a color television system in which the color information of the incoming video wave is arranged at recurrent, time-spaced intervals and a color synchronizing signal is contained on the video wave as a burst signal at the frequency of the respective color signals, the system of the invention provides a sampling signal generator of relatively wide frequency range and so restricts the spectrum of the burst signal that the receiver sampling signal generator may readily recognize the desired carrier frequency to the exclusion of the sidebands thereof. Such a restriction of the bandwidth of the color synchronizing burst signal may be effected by a suitable filter element arranged prior to the sampling signal generator and comprising for example, a piezoelectric crystal type band pass filter having its passband including the carrier frequency of the burst signal and attenuating all of the important sidebands of the carrier signal, or a notch type filter which similarly attenuates the undesired sidebands.

Figure 3:
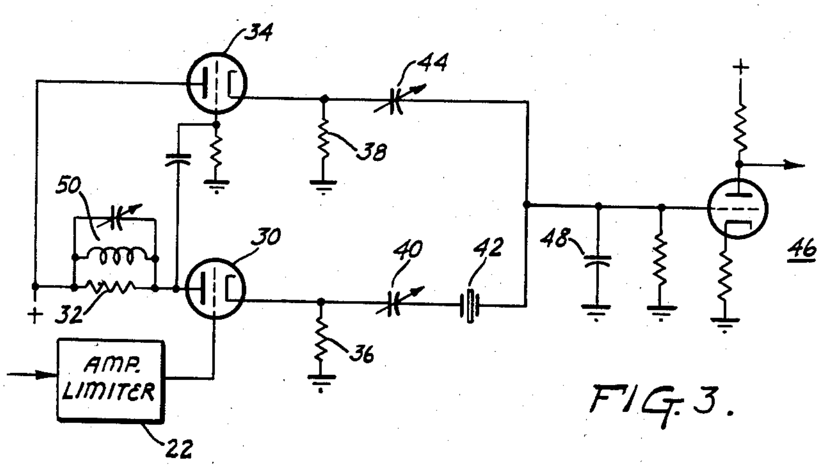
Figure 2:
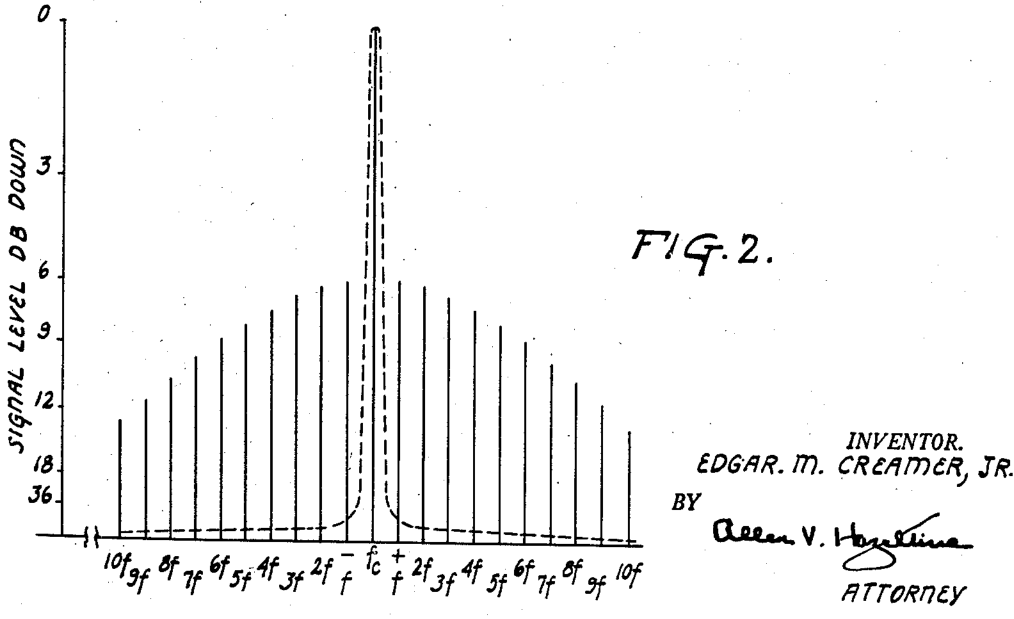

The invention will be described in greater detail with reference to the appended drawing forming part of the specification and in which:

Figure 1 is a block diagram of a color signal synchronizing system in accordance with the invention, Figure 2 is a graph showing the relative amplitudes and positions of a number of the frequency components of a color synchronizing burst signal, and Figure 3 is a schematic diagram showing one form of band pass filter suitable for the purposes of the invention.

Referring to Figure 1, the system thereshown comprises a portion of a color television image reproducer embodying the principles of the invention. As shown, the incoming video wave which may be modulated on a transmitted carrier wave in any well known manner, is derived from a receiver 10 which may be of conventional design and include the usual radio frequency amplifier, frequency conversion and detector stages.

As is well known, in a typical form, the incoming video wave comprises video signals, horizontal and vertical synchronizing pulses cyclically recurrent at the horizontal and vertical scanning frequencies, and blanking signals upon which the synchronizing pulses are pedestaled so as to insure that the scanning retrace lines will not become visible upon the receiver viewing tube screen. In accordance with present operating standards, the horizontal synchronizing pulses occupy only one-half the space atop each blanking pedestal. Furthermore, each horizontal synchronizing pulse occurs almost immediately after the beginning of the blanked interval so that nearly one-half of the trailing portion of the blanking pedestal is unoccupied. This trailing portion is often referred to as the "back porch" of the blanking pedestal and it is upon this back porch that the color burst synchronizing signal is ordinarily superimposed. Each burst consists of an odd number of half cycles of carrier signal whose frequency equals the rate at which the color information is sampled at the transmitter, or 3.58 mc./sec. in the present case. This carrier signal has, as its maximum excursion limits, the black level of the blanking signal and the peak of the synchronizing signal and the bursts thereof have a duration of approximately 5% of the interval used to scan one line of the image. The horizontal synchronizing pulses occur at a rate of 15,750 times per second.

The synchronizing pulses are applied to a sync separator 12 of conventional form and subsequently energize suitable horizontal and vertical deflection circuits of an image reproducer in well known manner. The image reproducer, which may consist of three cathode-ray tubes each having a fluorescent screen capable of producing a desired one of three primary colors, as well as the deflection circuits therefor are well known to those skilled in the art and it is not believed to be necessary to describe the same herein.

Interposed between consecutive horizontal synchronizing pulses of the incoming video wave is the video information denoting the luminosity and chromaticity of the image to be reproduced. This information is contained in the form of a wave having recurrent portions indicative of the color components of the image which, as above pointed out, is brought about by a sequential sampling technique at the transmitter.

The color information so contained in the video wave is applied to the color image reproducing device of the receiver through a sampling element 14 which operates to sample the video wave at spaced time intervals to produce three color component signals bearing the desired color information constituting the image to be reproduced. The design of the sampling element 14 may conform to standard practice and the sampler may consist for example, of three dual grid sampling tubes having one of their respective grids connected in common to the receiver 10 and having individual output circuits from which the individual color component signals are supplied to the reproducing device of the receiver, i. e. to the respective control electrodes of three cathode-ray tubes serving for the color image reproduction. The sampling tubes are operated in sequence at relative phase positions and at the frequency at which the color components appear in the input video wave and for this purpose the sampler 14 is energized by a sampling signal source 16 which provides appropriately phased synchronous voltages which may be applied to the second grids of the respective sampling tubes of the sampler 14.

The sampling signal source 16 is capable of operating at any of a plurality of frequencies within a relatively wide frequency range centered about the carrier frequency of the burst signal and may comprise an amplifier of suitable form or a controlled oscillator such as described in the copending application of Joseph C. Tellier, Serial No. 197,551, filed November 25, 1950.

In order to synchronize the operation of the source signal at the frequency at which the color components appear in the input video wave and to establish the exact time or phase reference of the color components of the input video wave, the video wave further comprises a marker signal which preferably consists of a burst of a carrier wave which is applied to the video wave during the horizontal retrace period immediately following the occurrence of the horizontal synchronizing pulse. This carrier wave has a frequency equal to that of the frequency of recurrence of the color components of the image signal and in a system having the transmission standards above outlined, the carrier frequency is approximately 3.58 mc./sec. and the duration of the burst may be of the order of 5% of the line scanning period.

As above pointed out, it has been found that a carrier burst signal of such short duration has a frequency spectrum in which the sidebands adjacent to the carrier wave amplitude values of the same order of magnitude as the amplitude of the carrier. Furthermore, since the carrier bursts occur at a relatively low rate compared to the carrier frequency (i. e. at 15,750 times per second when using the standards above specifically noted and a carrier at a frequency of 3.58 mc./sec.) the percentage frequency separation between the carrier and adjacent sidebands is relatively small (approximately 4.45%), and the sampling signal source 16 may experience difficulty in recognizing the carrier in order to actuate the sampler 14 at the required rate and phase for proper color reproduction.

More particularly, and as shown in Figure 2, a carrier burst signal having a duration of approximately 5% has a frequency spectrum including a multiplicity of sideband components spaced from the carrier frequency by amounts equal to multiples of the repetition rate of the burst signal. It will be noted that the sidebands as high as the tenth harmonic of the repetition frequency have amplitudes which are of the same order of magnitude as the amplitude of the carrier. More particularly, the first order sideband has an amplitude which is only approximately 6 db lower than the carrier amplitude and the amplitude of the tenth order sideband is only approximately 12 db lower than the carrier amplitude.

In order to ensure that the sampling signal source 16 operates exclusively at the carrier frequency, the system of the invention comprises a color synchronizing signal band pass filter 18 which preferentially transmits the carrier to the exclusion of the adjacent sidebands. Such a filter should provide an attenuation of at least 20 db of the important sidebands, the number of sidebands so attenuated being determined by the range of frequency selection of the sampling signal source 16.

The filter 18 may take the form of a series-mode bridge type piezo-electric crystal system having a passband centered at the carrier frequency of the burst signal. Such a system, having a passband of the order of 50 to 300 cycles or less at 3 db attenuation points and centered about a frequency of the order of 3.58 mc./sec., may readily be made. The passband characteristic of such a filter has been shown in Figure 2 by the dotted curve superimposed on the spectrum illustrated. The design of such a piezo-electric band pass system is well known to those skilled in the art and a suitable form thereof is shown in Figure 3.

The band pass system shown comprises a first triode tube 30 having its control grid coupled to the color burst signal source and its anode connected to a source of positive potential through an anode load resistor 32. There is also provided a second triode 34 having its control grid capacity-coupled to the anode of tube 30 and having its anode connected to the positive potential source. The tube circuits further incorporate cathode load resistors 36 and 38 respectively, by means of which two voltages in phase opposition and balanced to ground are obtained. The two voltages so obtained are applied to a series path comprising a variable capacitor 40, a piezo-electric crystal 42 and a variable capacitor 44. The junction of the crystal 42 and the capacitor 44 constitutes an output terminal and is coupled to the input of a suitable isolation amplifier 46, a return path for the signal being provided by means of a capacitor 48 connected between the said junction and ground. The circuit so formed is essentially a bridge circuit, each of two arms of which include a potential source constituted by the cathode resistors 36 and 38 respectively. The third arm is formed by the capacitor 44 and the fourth arm by the capacitor 40 and the crystal 42.

In operation the capacitor 40 is adjusted so as to make the series resonant frequency of the crystal 42 equal to the frequency of the carrier burst signal. Capacitor 44 is adjusted to a value such as to compensate for the shunt capacity of the crystal 42, such adjustment being effected to produce bridge balance at frequencies removed from the series resonant frequency of the crystal, under which conditions the crystal and its associated electrodes merely form a capacitor. To compensate for the difference in electrical losses between the capacitor 44 and the crystal 42 and the resultant departure from phase opposition between the bridge arms, the phase of the voltage across cathode resistor 38 may be modified by a phase shifting network 50 shunting the anode resistor 32.

The operation of the bridge is such that the crystal 42 presents a very low impedance to the carrier frequency to which it is series resonant and presents a high capacitive impedance to the sideband frequencies of the carrier burst signal. Accordingly, a large current at the carrier frequency will flow in the crystal branch of the bridge and a correspondingly large carrier frequency signal will be developed across the capacitor 48. At frequencies departing from the carrier frequency, i. e., at the sideband frequencies, only a small current will flow in the crystal branch and since the bridge is balanced at the sideband frequencies by the capacitor 44, there will be substantially no sideband energy appearing across the capacitor 48.

The filter 18 may alternatively take the form of a "notch" filter having attenuation peaks extending over a number of sidebands adjacent to the carrier frequency and passing the carrier frequency substantially unimpeded. The design of such filters for the particular frequencies herein concerned is well known to those skilled in the art and a further description thereof is believed to be unnecessary.

While the filter 18 should be selective enough to discriminate between the carrier frequency and its adjacent sidebands, it should not be so sharp as to exclude the carrier burst of those transmitters utilizing color synchronizing burst signals with frequencies at the ends of the allowable frequency tolerance range. Nor should the said filter be so sharp as to produce undesirably large phase changes in the carrier wave transmitted therethrough for minor departures of the received carrier burst signal from the central frequency of the passband of the filter. A suitable value for width of the passband of the filter 18 at the half-power points of the resonant curve, when utilizing a series mode piezo-electric crystal system, is of the order of 50 to 300 cycles/sec. To compensate for such phase changes as may be produced by the filter 18 within the tolerable limits or to provide a desired phase change of the carrier signal applied to the sampling signal source 16, there may be provided between the sampling signal source 16 and the filter 18 a suitable phase adjuster indicated by the block 20.

To facilitate the action of the filter 18 there may be provided, between the detector 10 and the filter 18, an amplitude limiter 22 by means of which the image signals are removed and only the synchronizing pulses and associated color burst signals are applied to the filter 18. Such an amplitude limiter may be of the type which levels at the pedestal value of the incoming video wave or may be of the so-called keying type which is conductive only during the period of the synchronizing pulses and the associated color burst signal, and is non-conductive during the intervening period when the image information exists. Amplitude limiters of the foregoing type are well known and it is believed to be unnecessary to describe the same in detail herein.

While I have described my invention by means of specific examples and in a specific embodiment, I do not wish to be limited thereto for obvious modifications will occur to those skilled in the art without departing from the spirit and scope of the invention.

What I claim is:

1. A color television receiving system, comprising input means for a video wave having color signal components recurring at a given frequency and having a marker signal component having a frequency equal to said given frequency and having a given amplitude variation at spaced time intervals at a repetition rate substantially smaller than said given frequency, said marker signal component being characterized by a carrier component at said given frequency and sideband components closely related to said carrier component both in frequency and amplitude, means to sample said video wave at said given frequency to derive therefrom said color signal components, means for actuating said sampling means, said actuating means being responsive to signal energy at frequencies in the neighborhood of said given frequency and therefore being subject to possible operation at the frequency of one of said sideband components, means coupled to said input means for selecting said marker signal component from said video wave to the exclusion of said color signal components, and narrow band filter means connected between said selecting means and said actuating means for transmitting to the latter signal energy at the frequency of said carrier component and for attenuating signal energy at the frequencies of said sideband components, thereby to effect actuation of said sampling means at the frequency of said carrier component and to preclude actuation of the sampling means at the frequency of one of said sideband components.

2. A system according to claim 1, wherein said narrow band filter means includes a piezo-electric crystal.

3. A system according to claim 1, wherein said selecting means comprises an amplitude selective device.

4. A system according to claim 1, wherein said selecting means is of the keying type which is conductive during occurrence of said marker signal component and is non-conductive during occurrence of the color signal components.

References Cited in the file of this patent

UNITED STATES PATENTS

| | | |
|---|---|---|
| 2,205,847 | Crosby | June 25, 1940 |
| 2,222,043 | Oram | Nov. 19, 1940 |
| 2,309,602 | Koch | Jan. 26, 1943 |
| 2,332,681 | Wendt | Oct. 26, 1943 |
| 2,489,327 | Royden | Nov. 29, 1949 |
| 2,584,532 | Bailey | Feb. 5, 1952 |
| 2,594,380 | Barton | Apr. 29, 1952 |

OTHER REFERENCES

"Recent Developments in Color Synchronization in The RCA Color Television System," RCA Bulletin, February 1950, pp. 1–7.